United States Patent Office 3,447,824
Patented June 3, 1969

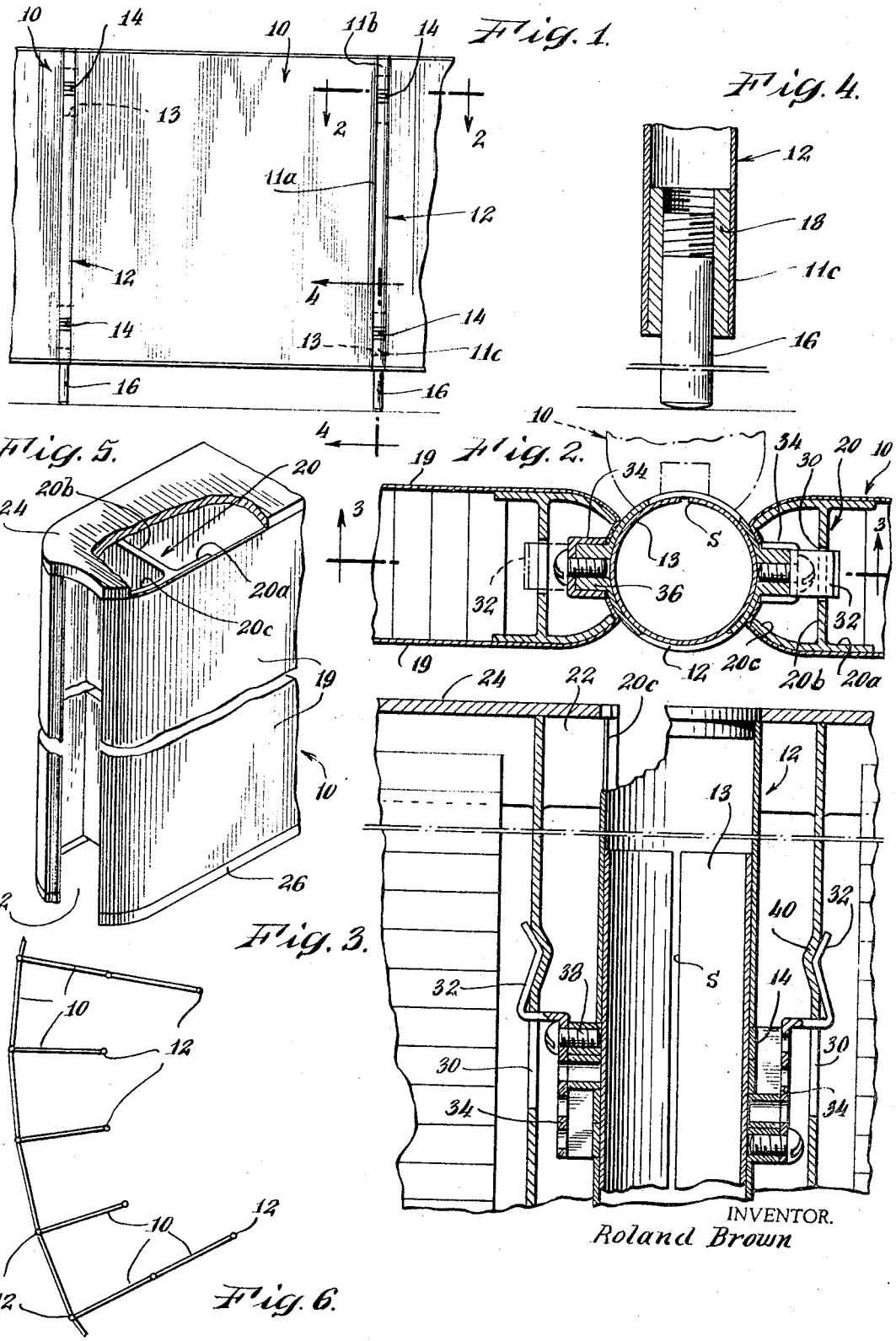
INVENTOR.
Roland Brown

3,447,824
SPACE PARTITIONING
Roland Brown, 4 Assisi Way, Norwalk, Conn. 06851
Filed May 9, 1967, Ser. No. 637,131
Int. Cl. F16b 1/00, 5/00, 7/00; E04g 7/00
U.S. Cl. 287—189.36
6 Claims

ABSTRACT OF THE DISCLOSURE

A sectional partition is provided with support and interconnecting means such that one section or panel may be adjustably related to another at any desired angle and so that one or more sections or panels may be connected to a support means and disposed at any angle throughout the whole range of 360°.

Summary

A plurality of wall panels of a sectional and movable wall or partition are interconnected at any desired relative angle by being connected respectively to ring members mounted for rotation around a column which is interposed between adjacent ends of the said panels, the rings preferably comprising bosses which are demountably fastened to an interconnecting means, preferably comprising a first portion which is channel shaped and has screw holes adapted to be aligned horizontally with screw holes in the ring bosses respectively, and adapted to receive one or more of the ring bosses therein and to be itself received within a reentry groove provided in the ends of the panel members, and a second longitudinally projecting portion which is a spring arm lock adapted to enter a slot in the bottom of said groove and provide a yielding engagement between the interconnecting member and the end of a panel member.

This invention relates to support means having means for attachment to a plurality of members disposed at any desired and variable relative angle.

Application of the invention is contemplated for interconnecting units of modular furniture.

Application of the invention is particularly contemplated for supporting and interconnecting panels of a movable wall or partition. The means presently available are unsatisfactory and lacking in flexibility as to the angular disposition of one panel relative to another.

The terms "wall" and "partition" are used herein interchangeably.

It is an object of the invention to provide means for interconnecting two or more wall panels at any relative angle.

Another object is to provide such interconnecting means which are readily adjustable to permit change in the relative angle between two or more wall panels or other members.

Another object is to interrelate a plurality of members at a desired relative angle by attaching them to a common intermediate member and adjusting the attaching members circumferentially of the intermediate member.

The invention will best be understood by reading the following description in connection with the drawings, in which:

FIGURE 1 is an elevation, partly broken away, looking at a wall assembly comprising three panels interconnected by two columns each having at vertically spaced intervals a set of attachment rings which are rotatable around the column, FIGURE 2 is a horizontal section taken on the lines 2—2 showing a prferred embodiment of the means for interconnecting the attachment rings to the ends of wall members or panels, FIGURE 3 is a vertical section taken on the lines 3—3 of FIGURE 2 showing the structure of the interconnecting members and how they are attached to the ring attachment means and yieldingly engaged in the grooves comprising the concave ends of the wall panels, FIGURE 4 is a detail view in elevation, enlarged and partly in section, taken on the lines 4—4 of FIGURE 1, FIGURE 5 is a perspective view, partly cut away, showing the structure of a preferred form of wall panel, and FIGURE 6 is a plan view of a wall assembly comprising wall panels interconnected as taught herein.

The wall assembly comprising this invention includes two or more wall panels spaced apart and interconnected by a column assembly, the panels being disposed end to end, either in straight line relation or in angular relation, and held in position by being connected to attachment means supported at the desired height on a column assembly and adjustable by rotation around the column.

FIGURE 1 shows a section of a wall assembly comprising a central panel 10 interconnected to two similar panels by means of columns 12 and rings 14 disposed on the columns respectively. Each panel is connected to one or more rings of the sets of rings 14, preferably by interconnecting members 34, to be described, and is disposed at a desired angle with respect to the adjacent panel.

Each column 12 comprises two central tubular members 13 spaced apart and interconnected by a tubular sleeve 11a cut to the length desired as the distance of separation between the two sets of rings 14 which are supported for rotation around the members 13. Tubular sleeves 11b and 11c are then slipped over the opposite ends of the tubular members 13 and coact with the sleeve portion 11a to retain the sets of rings 14 in the desired position on the central tubular members 13. Each member 13 is provided with a longitudinal slot s wide enough so that the member 13 can be modified in diameter sufficiently to compensate for tolerance differences in diameter of the sleeve portions 11a, 11b and 11c. When squeezing pressure on a member 13 is released it expands into frictional engagement with the sleeve members 11a, 11a or 11b, 11c which are then held in fixed position and coact with the central members 13 and the sets of rings 14 in forming a column assembly 12.

The columns are provided at their lower ends with the feet 16 which are telescopically related to the main and upper portions of the columns 12. By rotating feet 16 within the internally threaded tubular cores 18, provided within sleeve members 11c adjacent their lower ends respectively, the length of the columns and therefore the height of the wall assembly of which they form a part, may be adjusted vertically.

If desired the height of the wall panels may be increased by the addition of sections of glass, which may be supported on top of panels 10 in any desired way, but which are not shown since they form no part of the present invention.

FIGURES 2 and 3 show the preferred inter-relation of a column 12 and the abutting ends of two wall panels 10. As shown the ends of the wall panels which abut against the column 12 are shaped to provide a curved interface between the column and the ends of the panels respectively. The panels may be of any desired material but are preferably formed by thin sheets of metal 19 spaced apart to provide a panel of desired width. Between the sidewalls 19 of the panels, at their respective ends, the ferrules 20 are inserted, preferably formed of metal and comprising, the legs 20a which extend inwardly from cross wall 20b, and the outwardly projecting legs 20c which are curved inwardly toward one another defining a reentry groove 22. The space between the sidewalls of each panel is closed at top and bottom by the strips 24 and 26 respectively. The bottom strip 26 terminates at the cross wall 20b of the ferrule whereas the top strip 24 is shown extended forwardly of the cross wall and terminating flush with the forward spaced ends of the forwardly extending legs 20c of the ferrule 20, with front edge shaped concavely to complement the curvature of the column 12 against which the end of the wall panel abuts.

Both ends of a panel are preferably formed the same way except for panels having one end abutting against a wall, such as a fixed wall of a building in which the movable sectional wall which is the subject of this invention is disposed, in which case the end of the panel may be closed by a strip member extending the full height of the panel between the top and bottom strips 24 and 26.

The cross wall 20b of each ferrule 20 is formed with the cutouts or slots 30 adapted to receive and engage with a spring arm lock member 32 comprising a portion of an interconnecting member 34. Member 34 comprises a channel shaped portion 36 (FIGURE 2) adapted to receive the bosses 36 provided on the rings 14 respectively. The spring lock portion 32 projects from one end of the channel portion 36 of the interconnecting members 34. The length of the channel shaped portion is equal to the sum of the widths of the rings comprising a set of rings 14, and it is provided with screw holes equal in number to the rings and positioned to be aligned with the screw holes in the bosses of the rings respectively. When member 34 is attached to the top ring the top screw hole of the line of holes in portion 36, is used, or if member 34 is attached to the lowest ring the lowest screw hole is used. In this way the height of the spring lock portion 32 is always the same regardless of the ring to which member 34 is attached and it will therefore always be in register with the slots 30 and the indentations 40 which are similarly located for all panels.

In assembling a wall in accordance with my invention the grooved end of a panel 10 is somewhat raised and then lowered into contact with a column 12 so that the spring lock portion 32 of an interconnecting member 34 enclosing and secured to the boss or bosses of a ring or rings to which it is attached by screw means 38, enters the slot 30 provided in the cross wall of the ferrule 20. Preferably the inner surface of each ferrule cross wall 20b is indented at 40 adjacent the slot 30, and each spring lock 32 is correspondingly bent to engage the indentation 40 after it has been inserted through the slot 30 in a cross wall 20b. The seating of a spring lock arm 32 in the indentation 40 in a cross wall 20b provides a yielding interlock between a column 12 and the end of an abutting wall panel 10 through the interconnecting member 34 and the ring or rings 14 on the column to which it is attached.

In practice one or more of the rings 14 is rotated on its column to bring their boss or bosses 36 into position to enter into the groove 22 in the opposed end of a first wall panel which has been positioned as desired within the space to be divided by the wall or partition. An interconnecting member, preferably of the kind disclosed herein and comprising a channel portion 34 with a spring lock extension 32, is assembled with the bosses which have been thus positioned, and the end of the panel is attached to the column by inserting the spring lock portion 32 of the interconnecting member through the slot 30 provided in the cross wall 20b of the ferrule 20 comprising the opposed end of the wall panel. If only one other panel is to be connected to the column and remaining rings will be turned so that the bosses thereon are angularly disposed with respect to the first panel at the relative angle at which it is desired to dispose the second panel. The bosses of these rings are then nested in the channel portion 34 of an interconnecting member which is then inserted within the groove 22 in the opposed end of the second panel and is interengaged with the second panel within said groove.

It will be understood that as many panels may be interconnected with a given column 12 as there are rings in each set of rings on the column, within a limit set only by the relative circumference of the column and the width of the panels, and that by turning the rings individually to the angles desired for the several panels, and interengaging them with the panel ends respectively, the panels may be related at any desired angles, all radiating from the column. As indicated in FIGURE 6, by the means described herein, the panels may be interconnected in any angular relationship to form a straight line or a curved line, with one or more panels disposed at a right angle, or at any other desired angle with relation to the main line of the panels.

There has thus been provided method and apparatus in which the above mentioned objects are realized in a simple and practical way.

What I claim is:

1. A sectional movable wall structure comprising in combination, a supporting column, a plurality of rings mounted for rotation around the column and supported at selected heights on the column, a plurality of wall panels, a plurality of members interconnecting the rings and the panels respectively and each attachable selectively to any one of the rings on said column and having means coactive with an opposed panel end for yieldingly and detachably interconnecting the interconnecting member and a panel.

2. The structure claimed in claim 1 including, means for mounting the rings at different heights on the column for rotation to different angularly related positions around the column, and a plurality of interconnecting members each interchangeable between any one of the rings on said column and an opposed end of either of said panels.

3. The assembly claimed in claim 1 in which each interconnecting member has means for selective connection to either of said attachment rings.

4. The assembly claimed in claim 1 in which each panel comprises, two side walls spaced apart at least at one end by a ferrule, the ferrule having means coactive with means carried by the interconnecting member for yieldingly interconnecting the said ferrule and said member, each of said rings comprising means coactive with means defined by the interconnecting member for interchanging the ring and said member.

5. The combination claimed in claim 1 in which each ring means comprises a boss with a screw hole therein and the opposed end of the panel defines a slot, the interconnecting member comprises, a portion which defines a screw hole adapted to be aligned with the screw hole in the ring boss, and a longitudinally projecting spring arm lock portion insertable within a slot in the opposed panel and thereby providing a yielding engagement between the column and an end of the panel.

6. The combination claimed in claim 5 in whch said portion is a channel member adapted to receive the bosses of a plurality of rings and defines a plurality of screw holes aligned respectively with the screw holes in said bosses.

References Cited

UNITED STATES PATENTS

| | | | |
|---|---|---|---|
| 603,878 | 5/1898 | Hinman | 40—72 |
| 1,720,053 | 7/1929 | O'Brien | 40—72 |
| 2,805,502 | 9/1957 | Smith et al. | 40—72 |
| 2,577,323 | 12/1951 | Goenner | 52—496 |
| 2,855,037 | 10/1958 | Stiffel | 160—135 |
| 3,353,471 | 11/1967 | Roberts | 52—65 |

FOREIGN PATENTS

| | | |
|---|---|---|
| 333,592 | 12/1919 | Germany. |
| 281,092 | 12/1930 | Italy. |

CARL W. TOMLIN, *Primary Examiner.*

W. L. SHEDD, *Assistant Examiner.*

U.S. Cl. X.R.

40—72; 52—282, 496; 287—54

UNITED STATES PATENT OFFICE
CERTIFICATE OF CORRECTION

Patent No. 3,447,824                                                June 3, 1969

Roland Brown

It is certified that error appears in the above identified patent and that said Letters Patent are hereby corrected as shown below:

Column 2, line 6, "prferred" should read -- preferred --; line 50, "11a", second occurrence, should read -- 11b --; line 51, "11b" should read -- 11a --. Column 4, line 10, "column and" should read -- column the --; line 51, "interchangeable" should read -- interengagable --; line 62, "interchanging" should read -- interengaging --.

Signed and sealed this 21st day of April 1970.

(SEAL)
Attest:

Edward M. Fletcher, Jr.                                    WILLIAM E. SCHUYLER, JR.
Attesting Officer                                                  Commissioner of Patents